Sept. 15, 1936.    C. T. WALTER    2,054,148
SAUSAGE AND CASING THEREFOR
Filed May 27, 1935
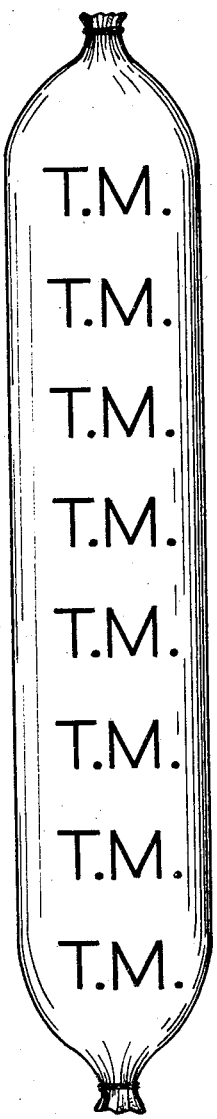
WITNESS-
Wm C. Meiser
Charles T. Walter
INVENTOR
BY Roy W. Johns
ATTORNEY Patented Sept. 15, 1936

2,054,148

UNITED STATES PATENT OFFICE 2,054,148

SAUSAGE AND CASING THEREFOR

Charles T. Walter, Chicago, Ill., assignor to Industrial Patents Corporation, Chicago, Ill., a corporation of Delaware Application May 27, 1935, Serial No. 23,669

9 Claims. (Cl. 99—175)

This invention relates to improvements in printing animal casings.

One of the objects of the invention is to provide an improved pre-printed animal casing.

Another object of the invention is to provide an improved method for printing animal casings.

Another object of the invention is to provide an improved pre-printed sausage product.

Other objects of the invention will be apparent from the description and claims which follow.

The drawing illustrates a perspective view of a stuffed sausage bearing the mark "TM" repeated along the surface of the sausage.

It has been proposed from time to time to mark sausages by tags and by various other marks. Direct printing upon the surface of synthetic cellulose casings has been found to be successful in practice. Direct printing upon natural casings prepared from animal intestines is inherently fraught with difficulty due to the nature of the tissue.

The present invention provides a method for direct printing on animal casings which withstands wetting and processing in a remarkable manner. In accordance with the present invention the animal casing is given no treatment other than that normally accorded animal casings and the printing is done directly upon the surface of the casing, the printed characters being fixed to the surface of the casing by the presence of a protein precipitant as an ingredient of the ink.

I have found in practice that formaldehyde is an effective protein precipitant which is miscible with ordinary inks available for printing sausage casings and results in a product which gives satisfactory results.

The ink of the present invention may be prepared by first preparing a formula as follows, the percentages being indicated by weight:

|  | Percent |
|---|---|
| Pigment (such as an oxide of titanium) | 60–65 |
| Fluid medium or menstruum | 40–35 |

The fluid medium, or fluid vehicle, which carries the pigments, preferably comprises:

|  | Percent |
|---|---|
| Water-proof spar varnish | 10–20 |
| Unsaponifiable waxy or greasy matter (for example 5 to 7 parts of paraffin and 100 parts petroleum jelly) | 5–10 |
| Lithographic linseed oils (litho-oils) | 70–85 |

Any suitable spar varnish may be employed. Preferably a varnish known in the varnish trade as "long oil" China-wood varnish is used. For example, the varnish may comprise 25 gallons of a drying oil, preferably China-wood oil, to 100 pounds of a natural or synthetic resin, or a combination of such resins. Thus, ester gum, other natural gums, or synthetic gums, such as potentially reactive phenol-condensation products may be employed.

A suitable water-proof spar varnish may be used in accordance with the specifications of the Bureau of Standards, entitled "United States Government Master Specification for Varnish, Spar Water Resisting", Federal Specifications Board No. 18b.

Any suitable substitute may be employed for the paraffin and petroleum jelly mixture of the waxy character set forth above. Where a mixture of paraffin and petroleum jelly is employed, preferably they are in the proportion of 5 to 7 parts paraffin to 100 parts of petroleum jelly.

The lithographic linseed oil employed is one which has been changed in consistency by the application of heat. A suitable range of consistencies is from 0000 to No. 8, as designated in the trade pertaining to litho-oils.

To this formula I may add from 10% to 20% of an approximately 30% formaldehyde solution. Having compounded an ink of this character, I print directly upon the animal casing in any suitable manner. By this method of application the quantity of formaldehyde entering into the printing of a single casing is negligible. It is apparent, of course, that most of the formaldehyde used in the ink evaporates as the ink dries, leaving an insignificant quantity of formaldehyde in the casing after the ink is dried.

This ink withstands wetting and processing and is fixed to the surface by the action of the formaldehyde. The characters formed are water-proof, smoke-proof and opaque and when hardened by drying do not rub off and are not damaged by stuffing, wetting or curing the sausage.

I have found in practice that formaldehyde is an effective protein precipitant for this purpose although other protein precipitants may be used. For example, 20% of powdered alum may be substituted for the formaldehyde in the foregoing formula. Similarly, any aldehyde may be used.

I claim:

1. The method of marking animal casings which comprises fixing thereon with a protein precipitant in a marking ink, a marking which is water-proof, smoke-proof and opaque.

2. The method of producing a marked cured stuffed sausage which comprises imprinting a mark or character with a water-proof, smoke-proof, opaque ink containing a protein precipitant upon an animal casing, hardening the ink, stuffing the printed casing with meat and processing the stuffed sausage.

3. As an article of manufacture, a sausage comprising a filling of sausage meat and a pre-printed animal casing bearing on its surface fixed hardened characters of ink comprising pigment, a protein precipitant, water-proof varnish, unsaponifiable waxy or greasy matter and litho-oil.

4. As an article of manufacture a sausage comprising a filling of sausage meat and a pre-printed animal casing bearing on its surface fixed exposed hardened characters of ink comprising pigment, formaldehyde, water-proof varnish, unsaponifiable waxy or greasy matter and litho-oil.

5. An animal sausage casing having thereon printed characters fixed to the surface with a protein precipitant contained in the ink forming the characters, said characters comprising exposed hardened insoluble smoke-proof, opaque ink.

6. An animal sausage casing bearing on its surface fixed exposed printed hardened opaque ink characters formed with ink comprising pigment, formaldehyde, water-proof spar varnish, unsaponifiable waxy or greasy matter and litho-oils.

7. An animal sausage casing bearing on its surface fixed exposed printed hardened opaque ink characters formed with ink comprising pigment, a protein precipitant, water-proof spar varnish, unsaponifiable waxy or greasy matter and litho-oils.

8. The method of marking animal casings which comprises fixing a water-proof, smoke-proof, and opaque mark thereon with a marking fluid containing formaldehyde.

9. The method of producing a marked, cured, stuffed sausage which comprises imprinting a mark with a water-proof, smoke-proof, opaque marking fluid containing formaldehyde upon an animal casing, hardening the ink, stuffing the printed casing with meat, and processing the stuffed sausage.

CHARLES T. WALTER.